July 19, 1955 E. R. FLYNN 2,713,500
ADJUSTABLE SEMI-TRAILER FIFTH WHEEL
Filed Nov. 25, 1953 3 Sheets-Sheet 1

INVENTOR.
EDWIN R. FLYNN.
BY

July 19, 1955
E. R. FLYNN
2,713,500
ADJUSTABLE SEMI-TRAILER FIFTH WHEEL
Filed Nov. 25, 1953
3 Sheets-Sheet 2
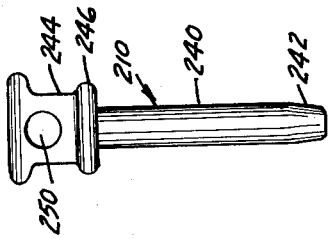
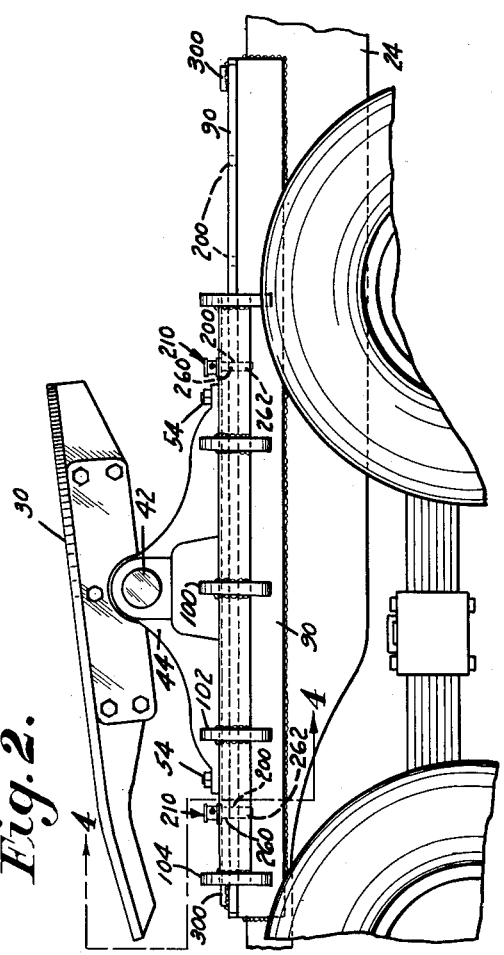
INVENTOR.
Edwin R. Flynn
BY

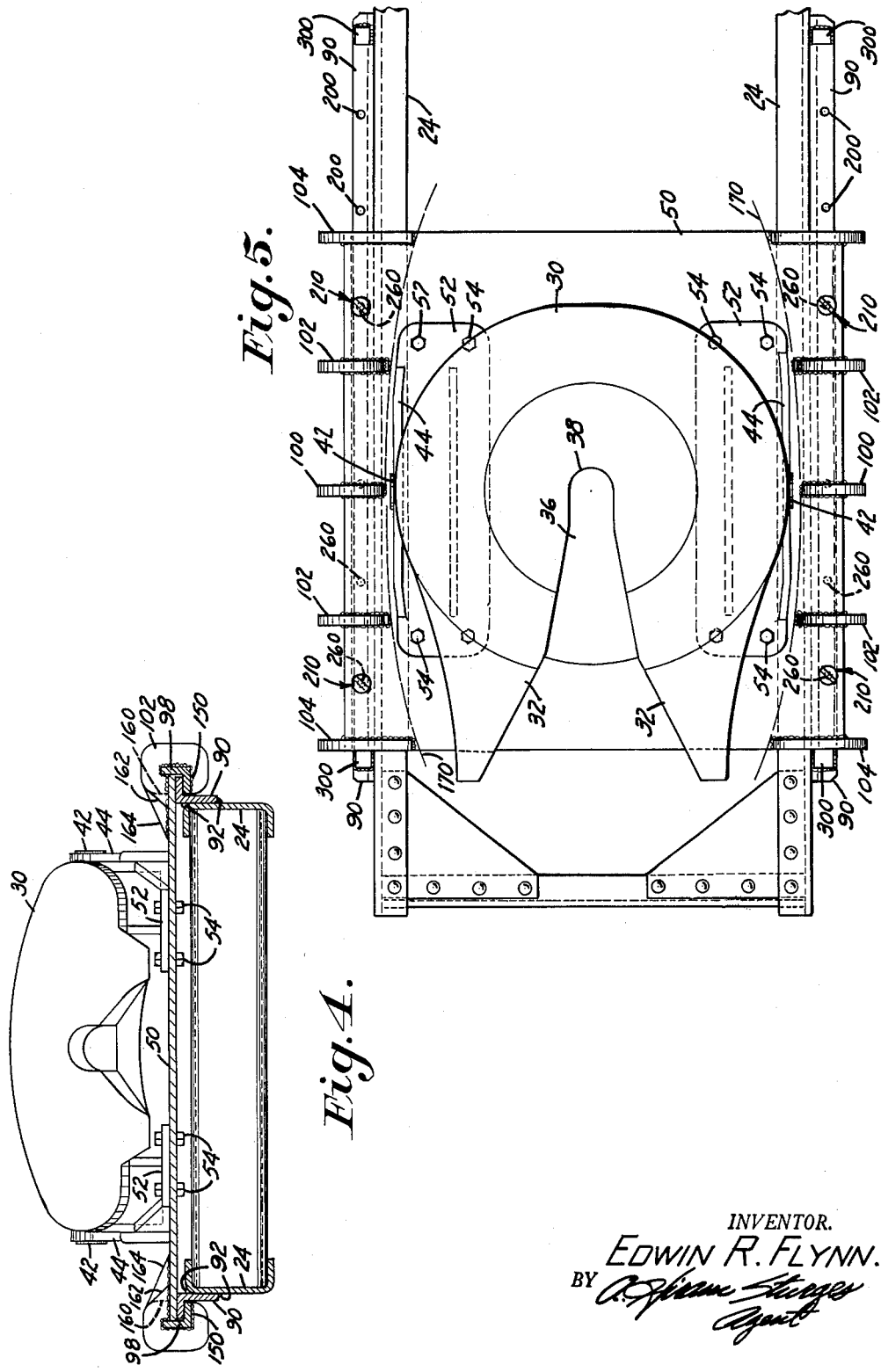

United States Patent Office 2,713,500
Patented July 19, 1955

2,713,500

ADJUSTABLE SEMI-TRAILER FIFTH WHEEL

Edwin R. Flynn, Valley, Nebr.

Application November 25, 1953, Serial No. 394,307

2 Claims. (Cl. 280—407)

This invention relates to semi-trailer trucks and more particularly it is an object of this invention to provide means for adjusting the position of a pivotal mounting connection between the tractor and trailer, this connection being commonly called the fifth wheel.

Heretofore, the lower section of the fifth wheel connection has been fixed to the tractor in only one position. For years this has had great disadvantages in that different trucking lines have the upper portions of their fifth wheel connections attached to the underside of the trailer in different positions.

This has had the result that with companies which exchange trailers, a driver may find that a trailer does not fit on his tractor, that its pivotal connection is so far rearward on the trailer it would bump the cab of the tractor if he were to attempt to make the connection.

It is an object of this invention to provide a semi-trailer fifth wheel, the lower section of which is adjustable forward and rearward on the tractor.

This invention has a further important object in making it possible to move the lower part of the pivotal connection rearward for causing the combined length of the tractor and trailer to be greater for spreading the weight of the semi-trailer and load over a greater length so that highways are not overloaded.

I am aware that attempts have been made to solve these problems through the provision of an adjustment between the fifth wheel kingpin and the trailer. The disadvantage of this method over my construction is in that most trailers do not have the facilities on them for receiving an adjustable kingpin. Also the provision of adjustability between the kingpin and the trailer necessitates a very heavy and expensive addition to the connection. I have found that with my conception a slidable and adjustable connection can be made at a small fraction of the cost of the kingpin adjustment.

For these reasons the kingpin adjustment construction has never received popular acceptance and has failed to solve the above mentioned very important and critical problems.

It is my conception to provide an inexpensive construction comprising the attachment of track members directly to the same members of the truck, the track members preferably being simple angle-irons and further to attain an inexpensive construction in the provision of track follower means, preferably including track follower angle-irons fixed to a carrying plate of the fifth wheel.

A further objective is to attain strength with an inexpensive construction through the use of approximately C-shaped brace members extending around the track follower angle iron members and attaching them to the fifth wheel carrying plate.

Yet a further objective is in the provision of approximately C-shaped bracing members as described, the upper and inner ends of which extend further toward the center of the carrying plate with respect to those brace members which are at the ends of the carrying plate than those at the center of the carrying plate, whereby the stress and strain is distributed over a greater area of a carrying plate and along a curved line on each side of the carrying plate so as to avoid the danger of cracking, shearing or crystalization of the carrying plate metal which might otherwise occur along a straight line under the inner upper ends of the braces.

The primary objective of my invention is to provide a construction for solving the above mentioned problems in a new way and in a way so practical as to be generally acceptable by the trucking industry.

A further object of the invention resides in the provision of stops fixed to the track members of the assembly thereby making it simple, quick and easy for an operator to adjust the position of drop pin apertures in the track and track follower members. I believe that lack of appreciation of this possibility may have been a further contributing factor to the inability of others to conceive my invention earlier.

Other and further objects and advantages of the present invention will be apparent from the following detailed description drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

Figure 2 is a detailed side elevation of the fifth wheel assembly of this invention and a portion of the tractor.

Figure 3 is a side elevation of a preferred form of simple pin for dependably attaching the fifth wheel assembly in a desired position along a supporting track.

Figure 4 is a view-in-section taken along the line 4—4 of Figure 2.

Figure 5 is a top plan view of the fifth wheel assembly shown as attached to the frame of a tractor.

Figure 1:
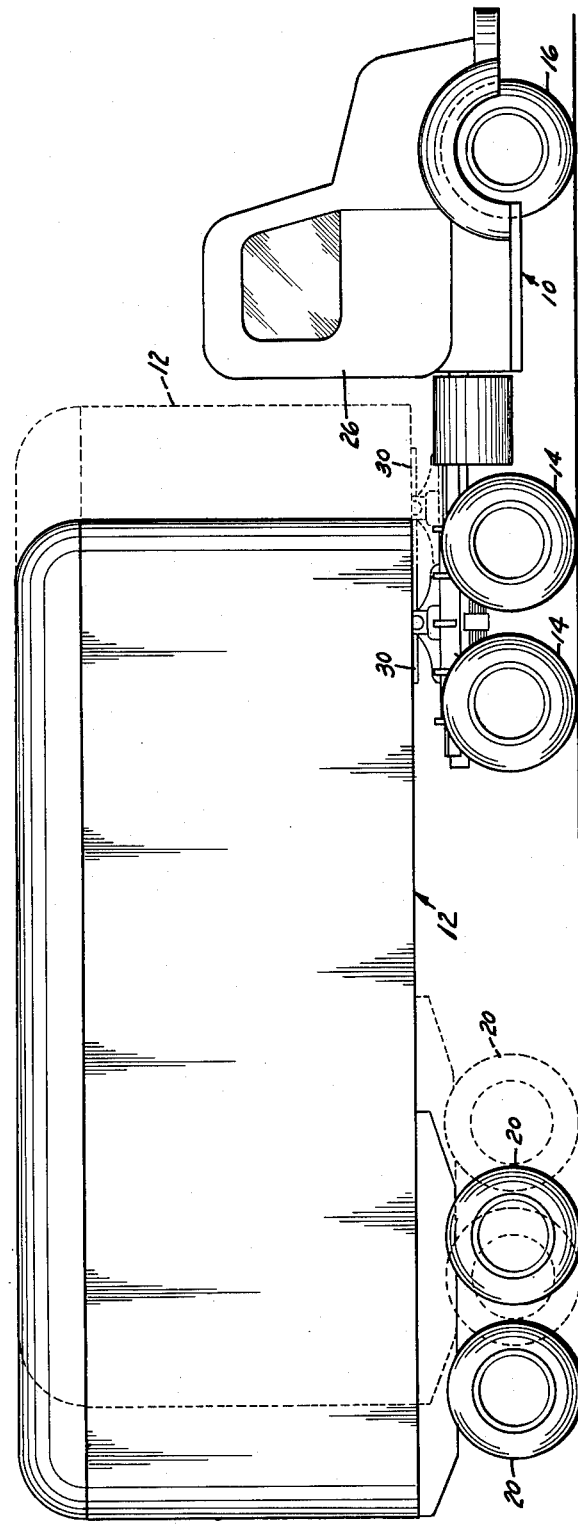
Figure 1 is a side elevation of a semi-trailer truck assembly shown with the adjustable fifth wheel mechanism of this invention attached thereto. A dotted line in Figure 1 shows a forward position of the trailer while a rearward position of the trailer is shown in full lines.

The tractor semi-trailer combination of this invention includes a tractor 10 and a trailer 12.

The tractor illustrated in Figure 1 has two rearward wheels 14 on each side and has one forward wheel 16 on each side. The trailer 12 can have two rearward wheels 20 on each side. The number of wheels on the tractor and trailer are of no importance to this invention.

The tractor 10 has two longitudinal forward and rearwardly extending frame members 24 which are transversely spaced apart and disposed in the right and left hand sides of the tractor extending above the rear wheels 14 behind the cab 26.

The most common type of connection between a tractor and trailer is a fifth wheel assembly which includes a fifth wheel member 30 having a main portion of substantially circular shape and having rearwardly extending and outwardly protruding portions 32 disposed on each side of a slot 36 extending inwardly to a center opening 38 for receiving a kingpin, not shown. The kingpin is a downwardly extending pin fixed to a trailer and which is locked in the opening 38 by means not shown to secure the trailer and tractor together.

The fifth wheel 30 has axle members 42 fixed to the underside thereof and extending horizontally outward, the axle members 42 being pivotally mounted in upright bearing members 44 which are fixed to a carrying plate 50 by means of suitable brackets 52 and bolts 54.

All of the foregoing is old in the art with the exception that the carrying plate 50 of this invention is not permanently secured to the frame members 24 as is customary.

The new features of this invention will now be described. In accordance with this invention longitudinally extending track members 90 are attached to the frame members 24. The track members 90 are preferably each of a right angle in cross section and extend forwardly and rearwardly longitudinally of the frame members 24. The track members 90 have vertically extending portions which are welded as at 92 or otherwise suitably secured to the frame members 24.

The track members 90 also have outwardly and horizontally extending portions, the upper sides of which are preferably disposed spaced above the upper portions of the frame members 24.

My invention further includes track follower means preferably comprising further members 98 of a right angle in cross section and disposed extending longitudinally of the track members 90. Each track follower member 98 has a horizontal portion disposed extending underneath the respective horizontal portion of the respective track member 90 and further has a vertically extending portion disposed extending upwardly along the horizontal portion of each respective track member 90.

The track follower members 98 are disposed in parallelism with the track members 90 and are suitably secured thereto.

A preferred means of securing the track follower members 98 to the horizontally disposed carrying plate 50 includes the use of a plurality of approximately C-shaped brace members which are numbered 100, 102 and 104. All brace members are of substantially the same shape with the exception of the inner ends of the uppermost portions thereof.

All of the brace members have lower portions extending beneath the lower portions of the respective track follower member 98 and suitably secured thereto as by means of the welding shown at 150.

The brace members have integral vertically extending portions secured by the welding 150 to the vertical portion of the respective track member 98 and have uppermost portions extending across the top of the respective track member 98 and extending inwardly of the carrying plate 50 being secured thereto by welding or other suitable means.

The inner, upper ends of the differently numbered brace members extend inwardly of the carrying plate 50 to different degrees. Those brace members 100 which are opposite the center opening 38 or otherwise disposed near the longitudinal center plate 50 have inner ends of their upper portions extending inwardly of the plate 50 preferably the same distance as the lowermost portions of the same brace members extend beneath the plate 50.

Those braces which are disposed farther from the longitudinal center of the plate 50 have upper portions extending farther inwardly.

Accordingly, the inner edge of the upper portion of the innermost brace members 100 extends directly downwardly as seen in dotted lines in Figure 4 at 160. The inner end of the upper portion of the adjacent brace members 102 are spaced further from the longitudinal center of the plate 50 and extend further inwardly of the upper side of the plate 50 as shown in Figure 4 at 162.

The forward and rearwardmost brace members 104 have upper portions 164 extending the greatest distance inwardly of the plate 50.

This variation in the size and position of the upper ends of the brace members is in order to distribute the stress of or shearing force of the weight of the forward end of the trailer along a curved line 170 which, for purposes of illustration, has been placed on the plate 50 in Figure 5. If the line of the inner ends of the upper portions of the brace members was straight, the stress or shearing force of the weight of the trailer would be concentrated along a straight line and the carrying plate 50 would be less able to withstand this force.

As best seen in Figure 5, the brace members on each side are longitudinally spaced apart with respect to other brace members on the same side and preferably equal distantly spaced apart. The brace members are each preferably disposed substantially in a vertical plane as seen in top plan view in Figure 1.

The track members 90 are provided with spaced apart apertures 200 extending vertically therethrough.

The apertures 200 are for the purpose of receiving drop pins 210, one of which is best illustrated in Figure 3. Each drop pin 210 has a normally vertically disposed elongated shank 240, having a tapered lower end 242 and having a head 244 at its upper end provided with a shoulder 246, at its lower side of a larger diameter than the shank 240 and larger than the openings 200, whereby the pin 210 cannot drop through the openings 200.

Each pin 210 is provided with an opening 259 therethrough, to which securing means, not shown, may be attached for preventing the loss of the pin.

The carrying plate 50 is provided with apertures vertically extending therethrough and best seen in dotted lines in Figure 5 at 260 for receiving the shanks 240 of the pins 210. The apertures 260 are disposed in registry with other apertures 262 extending through the track follower members 90, the position of the apertures 262 being best seen in Figure 2.

The apertures 260 and 262 are each preferably at least four in number and are adapted to be placed in registry with the apertures 200 in the tracks 90 in two or more longitudinally spaced apart positions, whereby the plate 50 can be secured by the pins 210 in at least one forward position and in at least one rearward position, the trailer 12 being disposed in the former case as indicated in dotted lines in Figure 1 and in the latter case as indicated in full lines in Figure 1.

As thus described it will be seen that the construction shown makes possible the selective positioning of the trailer forwardly or rearwardly.

If the trailer is in the forward position and the operator wishes to place it in the rearward position he can stop the truck, pull out the pins 210, drive the tractor forward until the apertures 260 and 262 are in alignment with the forward most apertures 200 of the track. Then the operator can put the pins in place and the assembly is in the position shown in full lines in Figure 1. In this position the truck is spread out over a longer pavement area and can travel over more lightly constructed highway paving without damage to such pavement.

When the operator wishes to shorten the length of the semi-trailer assembly, he can pull out the pins at a time when the truck is stopped, and back the tractor up to a position for the placing of the pins through the forward most of the track apertures 200.

It is, of course, impossible for an operator to pull the pins 210 from the apertures at times when the truck is normally traveling the highway. This provides a factor of safety which would not be present if the operator could control the disengagement of the two tracks from the cab.

To further assist the operator in easily aligning the respective pin apertures, stops 300 are provided on the forward and rearward ends of the track members 90 whereby in the adjustment above described an operator can drive the tractor forward until the plate 50 strikes the rearward stop 300 for adjusting the trailer in the rearward position. In this position the apertures 260 and 262 of the plate 50 and track follower 98 will be in alignment with the rearward set of apertures 200 of the track 90.

Conversely, when the operator wishes to place the trailer in the forward position, the tractor is backed up at a time when the trailer is stationary and the pins 210 are out. The carrying plate 50 then strikes the forward stop members 300 in which position the apertures 260 and 262 of the carrying plate 50 and the track follower members 98 are in alignment with the forwardmost set of apertures 200 of the track members 90.

In addition to a forward set and a rearward set of apertures 200, further intermediate sets can be used if desired.

From the foregoing description it is thought to be obvious that an adjustable semi-trailer fifth wheel constructed in accordance with my invention is particularly well adapted for use, by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice, except as claimed.

I claim:

1. A tractor semi-trailer combination of a type in which a fifth wheel is mounted on the tractor, the mounting of the fifth wheel as follows: a carrying plate disposed in horizontal position beneath said fifth wheel, means mounting said fifth wheel on said carrying plate, longitudinally extending track means composed of two transversely spaced apart angle members extending in parallelism longitudinally of and attached to said truck, said angle track members being provided with horizontally extending upper portions, and two angle track follower members disposed adjacent respective ones of said angle track members, said track follower members having portions disposed in a horizontal plane and extending beneath the horizontal portions of said track members, said track follower members having other portions extending vertically upwardly, approximately C-shaped bracing members disposed transversely of said track follower angle members and each extending around and being attached to the underside of the respective track follower angle member and further extending across the top of the respective track follower angle member and downwardly to and being attached to the upper side of said carrying plate.

2. A tractor semi-trailer combination of a type in which a fifth wheel is mounted on the tractor, the mounting of the fifth wheel as follows: a carrying plate disposed in horizontal position beneath said fifth wheel, means mounting fifth wheel on said carrying plate, longitudinally extending track means composed of two transversely spaced apart angle members extending in parallelism longitudinally of and attached to said track, said angle track members being provided with horizontally extending upper portions and two angle track follower members disposed adjacent respective ones of said angle track members, said track follower members having portions disposed in a horizontal plane and extending beneath the horizontal portions of said track members, said track follower members having other portions vertically extending upwardly, approximately C-shaped bracing members disposed transversely of said track follower members and each extending around and being attached to the underside of the respective track follower angle member and further extending across the top of the respective track follower member angle member and downwardly to and being attached to the upper side of said carrying plate, said approximately C-shaped bracing members being disposed at forwardly and rearwardly spaced apart points along said track follower angle members and the inner ends of the upper portions of those of said C-shaped members which are disposed toward the forward and rearward track follower angle members extending inwardly further than the corresponding upper ends of more inwardly disposed ones of said C-shaped bracing members.

References Cited in the file of this patent

UNITED STATES PATENTS

| Re. 23,704 | De Lay | Sept. 1, 1953 |
| 2,317,508 | Zoder | Apr. 27, 1943 |
| 2,332,326 | Lex | Oct. 19, 1943 |